United States Patent
Shanbhogue et al.

(10) Patent No.: US 8,555,380 B2
(45) Date of Patent: Oct. 8, 2013

(54) AUTOMATIC MODIFICATION OF EXECUTABLE CODE

(75) Inventors: Vedvyas Shanbhogue, Portland, OR (US); Ravi Sahita, Beaverton, OR (US); Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1559 days.

(21) Appl. No.: 12/039,486

(22) Filed: Feb. 28, 2008

(65) Prior Publication Data

US 2009/0222792 A1  Sep. 3, 2009

(51) Int. Cl.
    *G06F 11/00* (2006.01)
(52) U.S. Cl.
    USPC ............ 726/22; 726/23; 726/24; 726/25
(58) Field of Classification Search
    USPC .................................. 726/22–25
    See application file for complete search history.

(56) References Cited

U.S. PATENT DOCUMENTS

| | | | |
|---|---|---|---|
| 7,627,758 B1 * | 12/2009 | Tock et al. ............ | 713/168 |
| 8,127,292 B1 | 2/2012 | Dobrovolskiy et al. | |
| 8,171,321 B2 | 5/2012 | Kumar et al. | |
| 8,244,945 B2 | 8/2012 | Shanbhogue et al. | |
| 2002/0082824 A1 | 6/2002 | Neiger et al. | |
| 2002/0108050 A1 | 8/2002 | Raley et al. | |
| 2003/0149670 A1 | 8/2003 | Cronce | |
| 2004/0153672 A1 * | 8/2004 | Watt et al. ............ | 713/201 |
| 2005/0132122 A1 | 6/2005 | Rozas | |
| 2005/0204405 A1 | 9/2005 | Wormington et al. | |
| 2005/0223220 A1 | 10/2005 | Campbell | |
| 2005/0259678 A1 | 11/2005 | Gaur | |
| 2006/0080257 A1 | 4/2006 | Vaughan et al. | |
| 2006/0236094 A1 | 10/2006 | Leung et al. | |
| 2007/0006175 A1 | 1/2007 | Durham et al. | |
| 2007/0033419 A1 | 2/2007 | Kocher et al. | |
| 2007/0100771 A1 | 5/2007 | Eckleder et al. | |
| 2007/0192761 A1 | 8/2007 | Sahita et al. | |
| 2007/0234061 A1 | 10/2007 | Teo | |
| 2008/0022129 A1 | 1/2008 | Durham et al. | |
| 2008/0059811 A1 | 3/2008 | Sahita et al. | |
| 2008/0235793 A1 | 9/2008 | Schunter et al. | |
| 2008/0244573 A1 | 10/2008 | Sahita et al. | |

(Continued)

OTHER PUBLICATIONS

Tan et al., "Home PC Maintenance with Intel AMT", Intel Technology Journal, vol. 11, Issue 1, Feb. 15, 2007, pp. 57-66.

(Continued)

*Primary Examiner* — Tsan-Yu J Huang
(74) *Attorney, Agent, or Firm* — Garrett IP, LLC (57) ABSTRACT

A method for automatically modifying an executable file for a software agent is provided. The method comprises detecting original static entry and exit points in the executable file and generating corresponding transformed points; modifying the executable file by linking the executable file to the integrity services environment and embedding a signed agent manifest; loading the modified executable file into memory and registering a target list with the software agent's hypervisor, wherein the target list provides mappings between protected and active page tables; detecting dynamic entry and exit points in the executable file and generating corresponding transformed points; switching to a protected context, in response to a transformed exit point being invoked, and switching to an active context, in response a transformed entry point being invoked; and de-registering the software agent with the memory protection module, in response to the software agent being unloaded.

19 Claims, 4 Drawing Sheets

(56) References Cited

U.S. PATENT DOCUMENTS

| | | |
|---|---|---|
| 2009/0019437 A1 | 1/2009 | Feng et al. |
| 2009/0038017 A1 | 2/2009 | Durham et al. |
| 2009/0083532 A1 | 3/2009 | Brannock et al. |
| 2009/0172328 A1 | 7/2009 | Sahita et al. |
| 2009/0172346 A1 | 7/2009 | Sahita et al. |
| 2009/0172639 A1 | 7/2009 | Natu et al. |
| 2009/0241189 A1 | 9/2009 | Shanbhogue et al. |
| 2009/0323941 A1 | 12/2009 | Sahita et al. |
| 2009/0327575 A1 | 12/2009 | Durham et al. |
| 2010/0169667 A1 | 7/2010 | Dewan |
| 2010/0333206 A1 | 12/2010 | Dewan et al. |

OTHER PUBLICATIONS

"Intel Trusted Execution Technology Architectural Overview", Intel Corporation, retrieved from wayback machine, 2003, 8 Pages.

Sahita, Ravi et al. "Mitigating the Lying-Endpoint Problem in Virtualized Network Access Framework," Oct. 2007. Intel Corporation. International Federation for Information Processing. 12 Pages.

Dewan, Prashant et al. "A Hypervisor-Based System for Protecting Software Runtime Memory and Persistent Storage." Apr. 2008. Intel Corporation. Communications Technology Lab. Software Solutions Group. 8 Pages.

Uhlig, Rich et al. "Intel Virtualization Technology." IEEE Computer Society, May 2005. 9 pages.

Grevstad, Eric. "CPU-Based Security: The NX Bit." Jupiterimages, May 24, 2004. 4 pages.

Shanbhogue, Vedvyas et al. "Virtualization Enabled Integrity Services (VIS)." Nov. 2007. 10 pages.

* cited by examiner

AUTOMATIC MODIFICATION OF EXECUTABLE CODE

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to security in a virtual technology VT environment and, more particularly, to a system and method for automatically modifying executable code to provide a seamless interface between a software agent and integrity services.

BACKGROUND

Memory based attacks are a significant threat to computing environments. Some such attacks involve storing malicious code, such as a virus or a worm, in the memory of a computer system, then exploiting bugs or buffer overflows while running legitimate programs to transfer control to the malicious code.

Security, or integrity, services may be implemented to prevent memory based attacks from tampering with a program during execution. The program, however, may not be directly compatible with the integrity services and implementing the integrity services may involve manually editing the software agent's source code.

Systems and methods are needed to provide a seamless interface between a program and integrity services in a VT environment.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to systems and methods for automatic modification of compiled code for compatibility with security services.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for automatically modifying an executable file for a software agent to be compatible with an integrity services environment is provided. The method comprises detecting one or more first static entry and exit points in the executable file; generating one or more second entry and exit points corresponding to the first entry and exit points; modifying the executable file to link to the integrity services environment; embedding signed agent manifest into the modified executable file; loading the modified executable file into a first memory location referred to by a first page table; registering the software agent with a memory protection module, in response to successfully verifying the executable file's integrity, by using the embedded manifest where the manifest itself is authenticated using the signature on the manifest.

The method may further comprise registering a target list with a hypervisor for the software agent, wherein the target list provides mappings between the first page table and a second page table; detecting one or more third dynamic entry and exit points in the executable file; generating one or more fourth entry and exit points corresponding to the third entry and exit points; switching to a first mode, in response to a second or fourth exit point being invoked, wherein the first mode protects the software agent from memory attacks; switching to a second mode, in response to a second or fourth entry point being invoked, wherein the second mode does not protect the software agent from memory attacks; and de-registering the software agent with the memory protection module, in response to the software agent being unloaded.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
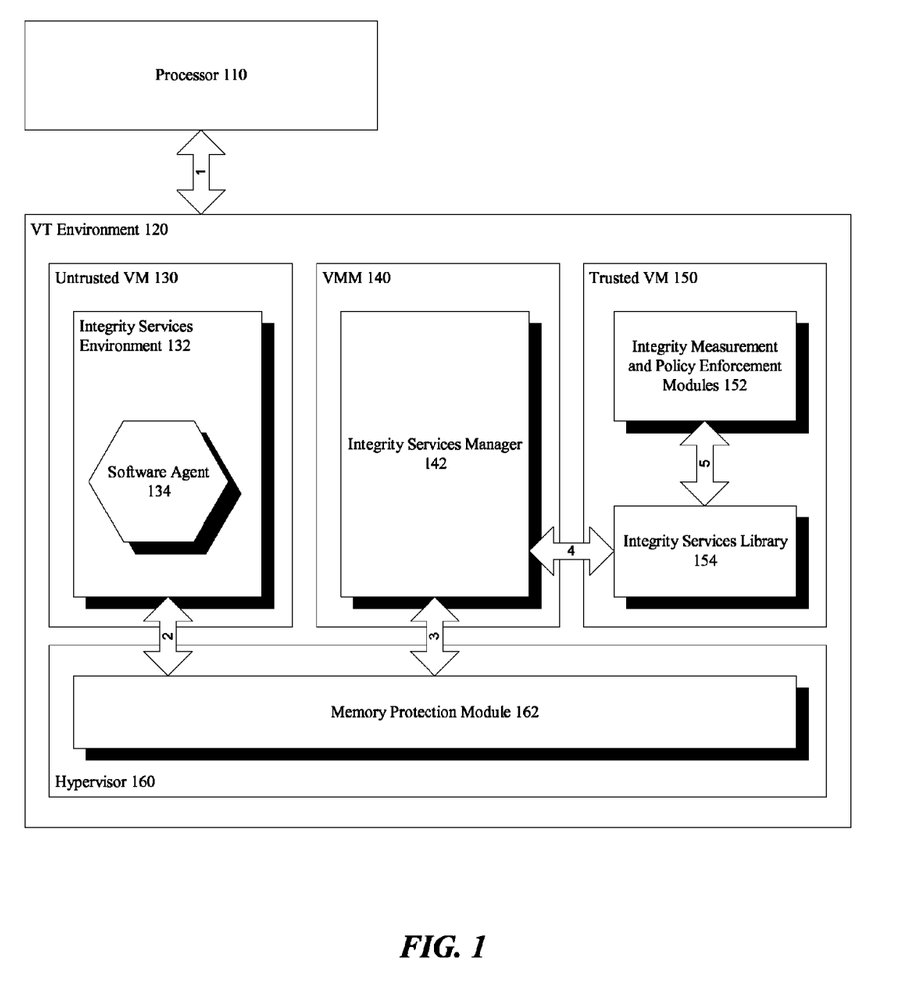
FIG. 1 is a block diagram of an exemplary virtual technology environment for protecting software agents from tampering, in accordance with one embodiment.

Referring to FIG. 1, in accordance with one embodiment, an exemplary computing system may comprise processor(s) 110, virtual technology (VT) environment 120, untrusted virtual machine (VM) 130, VM manager (VMM) 140, trusted VM 150, and hypervisor 160. Processor 110 may comprise a pointer or register (e.g., control register 3 or CR3), which defines the context in which processor 110's current is executed by indicating the page table for the task. Untrusted VM 130 may comprise programs and modules (e.g., software agent 134) and corresponding integrity services environments (e.g., integrity services environment 132). VM manager 140 may comprise integrity services manager 142, and trusted VM 150 may comprise integrity measurement and policy enforcement modules 152 and integrity services library 154. Hypervisor 160 may comprise memory protection module 162.

Processor 110 may communicate with VT environment 120 by way of connection 1. Integrity services environment 132 may communicate with memory protection module 162 by way of connection 2, and integrity services manager 142 may communicate with memory protection module 162 by way of connection 3. Integrity services manager 142 and integrity measurement and policy enforcement modules 152 may communicate with integrity services library 153 by way of connections 4 and 5, respectively.

In one embodiment, integrity measurement and policy enforcement modules 152 corresponding to software agent 134 may verify the integrity of software agent 134's executable image and static data when software agent 134 is loaded into VM 130's memory using the signed manifest. In one embodiment the manifest may be embedded in the executable image. Alternately the manifest can be made available to the integrity services manager using other means like as a separate file. Upon successful verification, integrity services manager 142 may register software agent 134 with memory protection module 162 by moving software agent 134's executable to a protected context associated with a protected page table so that software agent 134 is protected during execution.

In one embodiment, upon registration, memory protection module 162 may notify integrity measurement and policy enforcement modules 152. It is noteworthy that the term "protected" or "protected context" refers to a mode in which software agent 134 is protected from tampering by memory attacks, and the term "active" refers to a mode in which software agent 134 is unprotected from such attacks.

Figure 2:
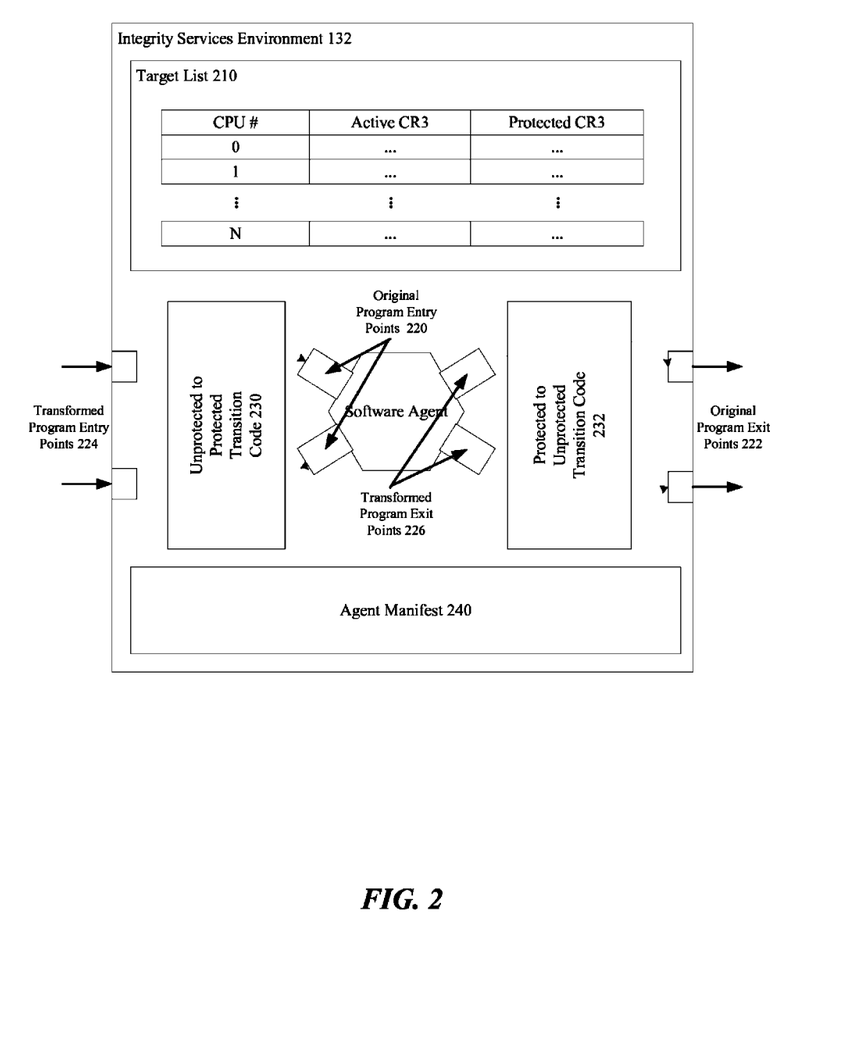
FIG. 2 illustrates an integrity services environment, in accordance with one embodiment.

Integrity services environment 132 may act as an interface between the unprotected environment of operating system 100 and software agent 134's executable code. Referring to FIGS. 1 and 2, in accordance with one embodiment, integrity services environment 132 may comprise software agent 134, target list 210, original program entry points 220, transformed program entry points 224, original program exit points 222, transformed program exit points 226, unprotected to protected transition codes 230, protected to unprotected transition codes 232, and agent manifest 240.

Target list 210 may comprise a memory page shared by integrity services environment 132 and memory protection module 162 that provides mappings for software agent 134's active page table and software agent 134's protected page table, for example. The memory page may be enforced by memory protection module 162 to be read-only from outside VMM 140. To switch software agent 134 into a protected context, hypervisor 160 may load the location of software agent 134's protected page table into a pointer or register (e.g., a CR3 register) in processor 110. To switch software agent 134 out of the protected context, hypervisor 162 may load the location of software agent 134's active page table into a pointer or register (e.g., CR3) in processor 110.

Hypervisor 160 may register protected page tables in CR3 target list 210 for each processor 110 in a computer system. Due to size restrictions, however, in some embodiments, hypervisor 160 may register a limited number of protected page tables. For example, in one embodiment, target list 210 may list mappings for only the three most recently used protected page tables, so that at most three protected contexts are valid on a context switch.

Still referring to FIGS. 1 and 2, in accordance with one embodiment, original program entry points 220 and original program exit points 222 for software agent 134 may be detected by transition code 230 and transition code 232, respectively. Upon detecting original program entry points 220 and original program exit points 222, transition code 230 and transition code 232 may generate transformed program entry points 224 and transformed program exit points 226 to control entry to and exit from software agent 134's protected context.

Transition code 230 and transition code 232 may detect original program entry points 220 and original program exit points 222 by statically analyzing software agent 134's executable code (e.g., by looking at export and import tables, respectively), for example. Certain entry and exist points that are dynamic, however, may be impossible to detect without more intelligent transition codes 230 and transition codes 232.

In the example below, if a program invokes a function foo ( ) to start a timer and passes the address to foo ( ) as the callback to be invoked on time expiry, foo ( ) becomes a dynamic program entry point into the program that cannot be detected by static analysis.

```
foo ( ) {
    // Handles time expiry
}
Program_fn ( ) {
    Register_time (10, foo, &context);
}
```

Still referring to the above example, transition code may replace original program exit point Register_time with transformed program exit point Stub_Register_time by replacing the suitable import table entry pointing to the address of Register_time. Stub_Register_time may implement the following algorithm:

```
Stub_Register_time (timeout, fn_address, caller_context) {
  1.  Allocate a dynamic or protected context and copy address of foo ( )
      and the caller provided or active context into the new protected
      context
  2.  Switch out of the protected context by loading the location for the
      active page table into CR3
  3.  Invoke the original program exit point: Register_time (timeout,
      Stub_timeout_handler, new_context);
  4.  Switch back into the protected context by loading the location for
      the protected page table into CR3
}
Stub_timeout_handler ( ) {
  1.  Switch into the protected context by loading the location for the
      protected page table into CR3
  2.  Invoke the original callback using the pointer for foo ( ) stored in
      dynamic context
  3.  Switch out of the protected context by loading the location for the
      active page table into CR3
}
```

Since, in the above example, the dynamic or protected context is created inside a protected environment, the protected context is not modifiable from outside the program. Therefore, although the pointer to the protected context is submitted to the Register_time function, any attempts to change the contents of the protected context and illegally enter the program by replacing the callback function pointer will fail.

Referring back to FIGS. 1 and 2, in accordance with one embodiment, when processor 110 invokes a transformed program entry point 224, if a valid protected page table is registered in target list 210, the transformed program entry point 224 may switch software agent 134 to the protected context associated with the protected page table. If a valid protected page table is not registered in target list 210, processor 110 may request hypervisor 160 to create and register a new protected page table for software agent 134 before switching to the protected context. In the protected context, transformed program entry point 224 may invoke corresponding original program entry point 220.

When processor 110 invokes a transformed program exit point 226, the transformed program exit point 226 may switch software agent 134 back to the active context by loading the processor 110 register (e.g., CR3) with the location of the active page table. Once software agent 134 has switched out of the protected context, transformed program exit point 226 may invoke corresponding original program exit point 222.

Figure 3:
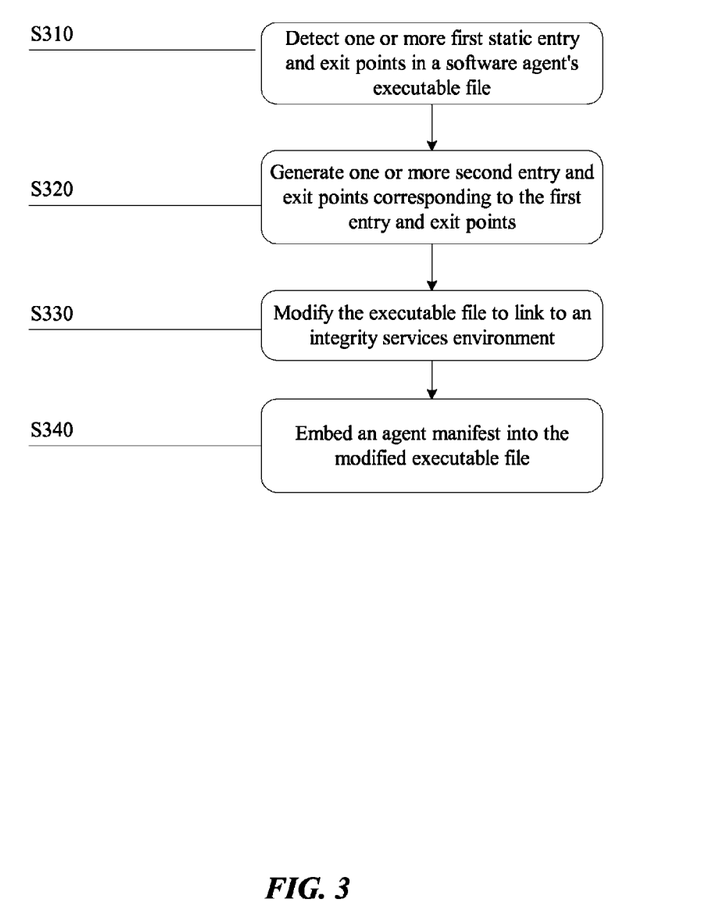
FIG. 3 is a flow diagram of an exemplary method for automatically modifying an executable file using static analysis, in accordance with one embodiment.

Referring to FIGS. 1-2 and FIG. 3, in accordance with one embodiment, software agent 134 may be automatically modified to be compatible with integrity services environment 132. A tool may be implemented to detect original program entry points 220 and original program exit points 222 in software agent 134's executable file (e.g., by searching import and export tables) (S310) and generate transformed program entry points 224 and transformed program exit points 226 (S320). Once transformed program entry points 224 and transformed program exit points 226 are generated, the tool may modify the executable file by linking the file to integrity services environment 132 (S330) and embedding agent manifest 240 (S340).

For example, with a portable executable (PE) type executable file, a processor may read executable code in the file into memory (S310), analyze the import table and export table in the executable code to detect the program's entry points and exit points, respectively (S330). Other entry points and exit points may be detected based on the program's class (e.g., network driver interface specification or NDIS drivers may have a set of pre-defined entry points and exit points) (S330). A transformed entry point for each entry point and a transformed exit point for each exit point may be generated in a wrapper binary (S340), and a new export table that points to the transformed entry points and a new import table that points to the transformed exit points may also be generated in the wrapper binary (S350). The executable code may then be merged with the wrapper binary (S350), and a manifest for the modified executable code may be embedded into the executable code (S360).

Figure 4:
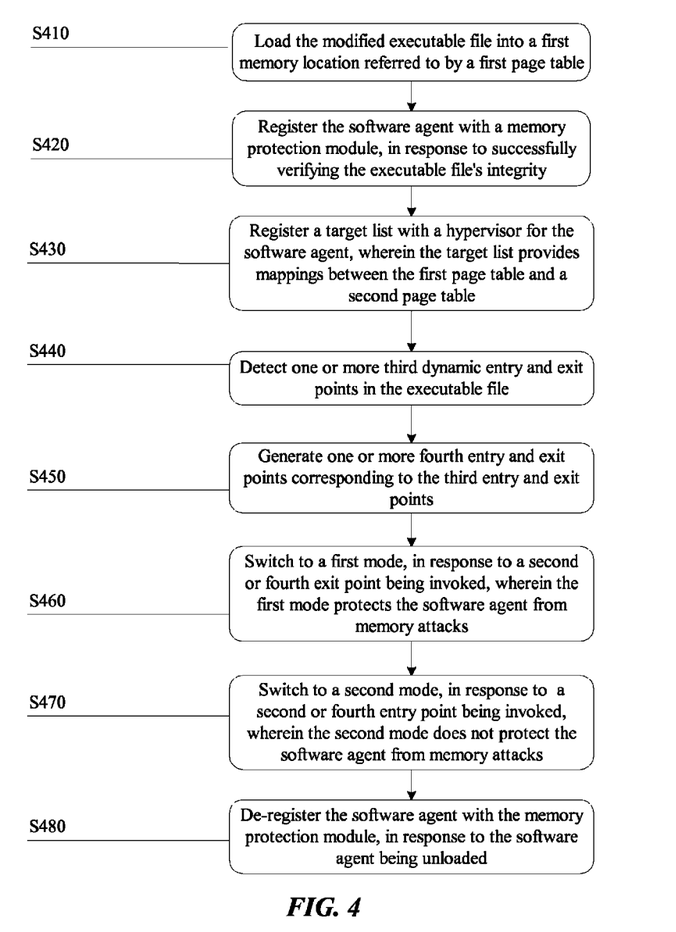
FIG. 4 is a flow diagram of an exemplary method for automatically modifying an executable file during execution, in accordance with one embodiment.

Referring to FIGS. 1-2 and FIG. 4, in accordance with one embodiment, processor 110 may execute software agent 134 after the executable file has been modified. Processor 110 may load software agent 134's executable file into a memory location referred to by software agent 134's active page table (S410). Once integrity measurement and policy enforcement modules 152 successfully verify the executable file's integrity using the signed manifest, software agent 134 may be registered with memory protection module 162 (S420), and target list 210 may be registered with hypervisor 160 (S430). If any dynamic original program entry points 220 and original program exit points 222 are detected (S440), corresponding transformed program entry points 224 and transformed program exit points 226 may be generated (S450). When a transformed program entry point 224 is invoked, the transformed program entry point 224 may switch software agent 134 to a protected context (S460). When a transformed program exit point 226 is invoke, the transformed program entry point 226 may switch software agent 134 to an active context (S470). Once software agent 134 finishes execution and is unloaded, software agent 134 may be de-registered with memory protection module 162 (S480).

The above implementation is advantageous because it allows programs in a VT environment to have access to integrity services without forcing a user to manually edit source code (e.g., to add transformed entry and exit points or registration/de-registration code). In many cases, the source code for a program that a user wishes to protect may not be available, or the program's vendor may not wish to maintain different source code versions of the program to support changes to VT based integrity services. Automatic modification of executable code, on the other hand, does not require access to a program's source code, and the interface (e.g., integrity services environment) to VT based integrity services may be changed without recompiling the program.

It should be understood that the logic code, programs, modules, processes, methods, and the order in which the respective elements of each method are performed are purely exemplary. Depending on implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for automatically modifying an executable file for a software agent to be compatible with an integrity services environment, the method comprising:

searching import and export tables in the executable file to detecting one or more first static entry and exit points in the executable file;

generating, in a wrapper binary, one or more second entry and exit points corresponding to the first entry and exit points;

generating in the wrapper binary a new import table and a new export table that point to the generated one or more second entry and exit points;
merging the executable file with the wrapper binary to produce a merged executable file;
modifying the merged executable file to link to the integrity services environment, to produce a modified executable file;
embedding an agent manifest into the modified executable file;
loading the modified executable file into a first memory location referred to by a first page table;
registering the software agent with a memory protection module, in response to successfully verifying the executable file's integrity using the manifest;
registering a target list with a hypervisor for the software agent, wherein the target list provides mappings between the first page table and a second page table;
detecting one or more third dynamic entry and exit points in the executable file, the detecting includes detecting a third dynamic exit point and a related dynamic exit point that is called when the third dynamic exit point is invoked;
generating one or more fourth entry and exit points corresponding to the third entry and exit points, the generating the one or more fourth entry and exit points includes generating a fourth exit point and a related exit point, to replace the detected third dynamic exit point and the related dynamic exit point, respectively;
switching to a first mode, in response to a second or fourth exit point being invoked, wherein the first mode protects the software agent from memory attacks;
switching to a second mode, in response to a second or fourth entry point being invoked, wherein the second mode does not protect the software agent from memory attacks;
the invoking the fourth exit point includes allocating a dynamic context and storing therein code associated with the detected third dynamic exit point and its related dynamic exit point, switching to the second mode, invoking the detected third dynamic exit point so as to call the related exit point in the dynamic context, and switching to the first mode; and
de-registering the software agent with the memory protection module, in response to the software agent being unloaded.

2. The method of claim 1, wherein the first page table is associated with the first mode.

3. The method of claim 1, wherein the second page table is associated with the second mode.

4. The method of claim 1, wherein registering the software agent with the memory protection module comprises:
loading the executable file into a second memory location referred to by the second page table,
wherein the memory protection module enforces the second memory location as read-only except through the second and fourth entry and exit points.

5. The method of claim 1, wherein switching to the first mode comprises:
identifying a processor that is executing the executable file;
searching the target list for a mapping that provides a location for the first page table;
generating a hyper call into the hypervisor, in response to failing to find the mapping;
creating the mapping in the target list, in response to failing to find the mapping; and
loading a first pointer in the processor with the location of the first page table.

6. The method of claim 1, wherein switching to the second mode comprises:
identifying a processor that is executing the executable file;
searching the target list for a valid mapping that provides a location for the second page table;
generating a hyper call into the hypervisor, in response to failing to find the mapping;
creating the mapping in the target list, in response to failing to find the mapping; and
loading a first pointer in the processor with the location of the second page table.

7. A system for automatically modifying an executable file for a software agent to be compatible with integrity services environment, the system comprising:
a processor;
a memory including computer-executable instructions, the computer-executable instructions when executed by the processor causes the processor to perform the steps of:
searching import and export tables in the executable file to detecting one or more first static entry and exit points in the executable file;
generating, in a wrapper binary, one or more second entry and exit points corresponding to the first entry and exit points;
generating in the wrapper binary a new import table and a new export table that point to the generated one or more second entry and exit points;
merging the executable file with the wrapper binary to produce a merged executable file;
modifying the merged executable file to link to the integrity services environment, to produce a modified executable file;
embedding an agent manifest into the modified executable file;
loading the modified executable file into a first memory location referred to by a first page table;
registering the software agent with a memory protection module, in response to successfully verifying the executable file's integrity using the manifest;
registering a target list with a hypervisor for the software agent, wherein the target list provides mappings between the first page table and a second page table;
detecting one or more third dynamic entry and exit points in the executable file, the detecting includes detecting a third dynamic exit point and a related dynamic exit point that is called when the third dynamic exit point is invoked;
generating one or more fourth entry and exit points corresponding to the third entry and exit points, the generating the one or more fourth entry and exit points includes generating a fourth exit point and a related exit point, to replace the detected third dynamic exit point and the related dynamic exit point, respectively;
switching to a first mode, in response to a second or fourth exit point being invoked, wherein the first mode protects the software agent from memory attacks;
switching to a second mode, in response to a second or fourth entry point being invoked, wherein the second mode does not protect the software agent from memory attacks;
the invoking the fourth exit point includes allocating a dynamic context and storing therein code associated with the detected third dynamic exit point and its related dynamic exit point, switching to the second mode, invoking the detected third dynamic exit point so as to call the related exit point in the dynamic context, and switching to the first mode; and de-registering the software agent with the memory protection module, in response to the software agent being unloaded.

8. The system of claim 7, wherein the first page table is associated with the first mode.

9. The system of claim 7, wherein the second page table is associated with the second mode.

10. The system of claim 7, wherein the computer-executable instructions to cause the processor to register the software agent include computer-executable instructions to cause the processor to:

loading the executable file into a second memory location referred to by the second page table, wherein the memory protection module is configured to enforces the second memory location as read-only from outside except through the second and fourth entry and exit points.

11. The system of claim 7, wherein the computer-executable instructions to cause the processor to switch to the first mode include computer-executable instructions to cause the processor to:

identifying a processor that is executing the executable file;

searching the target list for a mapping that provides a location for the first page table;

generating a hyper call into the hypervisor, in response to failing to find the mapping;

creating the mapping in the target list, in response to failing to find the mapping; and loading a first pointer in the processor with the location of the first page table.

12. The system of claim 7, wherein the computer-executable instructions to cause the processor to switch to the second mode include computer-executable instructions to cause the processor to:

identifying a processor that is executing the executable file;

searching the target list for a mapping that provides a location for the second page table;

generating a hyper call into the hypervisor, in response to failing to find the mapping;

creating the mapping in the target list, in response to failing to find the mapping; and loading a first pointer in the processor with the location of the second page table.

13. A non-transitory computer readable medium encoded with a computer program to modify an executable file for a software agent to be compatible with an integrity services environment, the computer program including instructions to cause a processor to:

searching import and export tables in the executable file to detecting one or more first static entry and exit points in the executable file;

generating, in a wrapper binary, one or more second entry and exit points corresponding to the first entry and exit points;

generating in the wrapper binary a new import table and a new export table that point to the generated one or more second entry and exit points;

merging the executable file with the wrapper binary to produce a merged executable file;

modifying the merged executable file to link to the integrity services environment, to produce a modified executable file;

embedding an agent manifest into the modified executable file;

loading the modified executable file into a first memory location referred to by a first page table;

registering the software agent with a memory protection module, in response to successfully verifying the executable file's integrity using the manifest;

registering a target list with a hypervisor for the software agent, wherein the target list provides mappings between the first page table and a second page table;

detecting one or more third dynamic entry and exit points in the executable file, the detecting includes detecting a third dynamic exit point and a related dynamic exit point that is called when the third dynamic exit point is invoked;

generating one or more fourth entry and exit points corresponding to the third entry and exit points, the generating the one or more fourth entry and exit points includes generating a fourth exit point and a related exit point, to replace the detected third dynamic exit point and the related dynamic exit point, respectively;

switching to a first mode, in response to a second or fourth exit point being invoked, wherein the first mode protects the software agent from memory attacks;

switching to a second mode, in response to a second or fourth entry point being invoked, wherein the second mode does not protect the software agent from memory attacks;

the invoking the fourth exit point includes allocating a dynamic context and storing therein code associated with the detected third dynamic exit point and its related dynamic exit point, switching to the second mode, invoking the detected third dynamic exit point so as to call the related exit point in the dynamic context, and switching to the first mode; and de-registering the software agent with the memory protection module, in response to the software agent being unloaded.

14. The computer readable medium of claim 13, wherein the first page table is associated with the first mode.

15. The computer readable medium of claim 13, wherein the second page table is associated with the second mode.

16. The computer readable medium of claim 13, wherein the instructions to cause the processor to register the software agent with the memory protection module further include instructions to cause the processor to:

load the executable file into a second memory location referred to by the second page table, wherein the memory protection module is configured to enforce the second memory location as read-only except through the second and fourth entry and exit points.

17. The computer readable medium of claim 13, wherein the instructions to cause the processor to switch to the first mode include instructions to cause the processor to:

identify a processor that is executing the executable file;

search the target list for a mapping that provides a location for the first page table;

generate a hyper call into the hypervisor, in response to failing to find the mapping;

create the mapping in the target list, in response to failing to find the mapping; and load a first pointer in the processor with the location of the first page table.

18. The computer readable medium of claim 13, wherein the instructions to cause the processor to switch to the second mode include instructions to cause the processor to:

identify a processor that is executing the executable file;

search the target list for a valid mapping that provides a location for the second page table;

generate a hyper call into the hypervisor, in response to failing to find the mapping;
create the mapping in the target list, in response to failing to find the mapping; and
load a first pointer in the processor with the location of the second page table.

19. The method of claim 1, wherein invoking the detected third dynamic exit point so as to call the related exit point results in:
switching to the first mode;
invoking the related dynamic exit point in the dynamic context; and
switching to the second mode.

* * * * *